United States Patent [19]

Maeda et al.

[11] Patent Number: 4,731,771
[45] Date of Patent: Mar. 15, 1988

[54] TRACKING SERVO SETTING METHOD AND APPARATUS

[76] Inventors: Takeshi Maeda, 21-19, Honcho-4-chome, Kokubunji-shi; Kazuo Shigematsu, 1-12 Takahisa, Yoshikawamachi, Kitakatsushika-gun, Saitama-ken; Shigeru Nakamura, 32, Koyasumachi-2-chome, Hachioji-shi; Yoshito Tsunoda, 24-12-310, Mure-6-chome, Mitaka-shi; Masuo Kasai, 11-17, Motohongocho-1-chome, Hachioji-shi, all of Japan

[21] Appl. No.: 829,024

[22] Filed: Feb. 13, 1986

[30] Foreign Application Priority Data

Feb. 25, 1985 [JP] Japan ............................ 60-34356

[51] Int. Cl.$^4$ ............................................. G11B 7/085
[52] U.S. Cl. ........................................ 369/44; 369/32
[58] Field of Search ................... 358/342, 907; 360/78; 369/30, 32, 33, 43, 44, 45, 46, 111

[56] References Cited

U.S. PATENT DOCUMENTS

| | | | |
|---|---|---|---|
| 4,096,534 | 6/1978 | Brownback et al. | 360/78 |
| 4,138,663 | 2/1979 | Lehureau et al. | 369/32 |
| 4,268,745 | 5/1981 | Okano | 369/44 |
| 4,330,880 | 5/1982 | Van Dijk | 369/32 |
| 4,627,038 | 12/1986 | Abed et al. | 369/44 |
| 4,630,250 | 12/1986 | Nonomura | 369/32 |

Primary Examiner—Donald McElheny, Jr.
Attorney, Agent, or Firm—Antonelli, Terry & Wands

[57] ABSTRACT

This invention relates to a track setting method for a tracking servo system in an optical disk device and a device therefor. According to this invention the track passage velocity when the light spot moves across the track is detected and setting of the light spot onto the track is performed under the condition that the passage velocity thus detected is lower than a predetermined velocity. In the case where the passage velocity is greater than the predetermined velocity, the light spot is forced to move so that the passage velocity is lower than the predetermined velocity and the light spot is set up thereafter.

16 Claims, 12 Drawing Figures

TRACKING SERVO SETTING METHOD AND APPARATUS

BACKGROUND OF THE INVENTION

This invention relates to an optical disk device and in particular to a tracking servo setting method and a device therefor suitable for a tracking servo system.

According to conventional tracking servo setting methods for optical disk devices, for example as described in U.S. Pat. No. 4,527,263, the state of the eccentricity was measured and memorized, and the light spot was forced to move with respect to and along the track according to the stored memory content, which was continuously read out, so that track setting could be performed. However, this method had drawbacks that a certain period of time is necessary for memorizing the state of the eccentricity and that setting operation becomes unstable when there exist track deviations due to causes other than the eccentricity such as remaining vibration of the head after the termination of a seek operation, shock from the exterior, etc.

SUMMARY OF THE INVENTION

An object of the present invention is to provide a tracking servo setting method and a device therefor, by which it is not necessary to memorize the state of the eccentricity as mentioned above and it is possible to set up the light spot onto the track in a short time, thus permitting to the device pass from the seek operation to the tracking servo operation in a short time.

Another object of this invention is to provide a tracking servo setting method and a device therefor enabling the light spot to be set up into the track in a short time, even if there exist track deviations due to causes other than the eccentricity.

In order to achieve these objects, according to this invention, the passage velocity of the light spot when it moves across the track is detected and used for determining the start time of the setting operation. Since the relative velocity of the light spot with respect to the track is limited in order that the setting operation can be effected stably, the light spot is set up when the detected passage velocity is smaller than the limit velocity.

According to another feature of this invention, when the passage velocity is greater than the limit velocity, the light spot is forced to be retarded so that the relative velocity is smaller than the limit velocity and the light spot is set up into the track thereafter. In this way, a stable setting can be realized in a short time.

DESCRIPTION OF THE PREFERRED EMBODIMENTS

Figure 1:
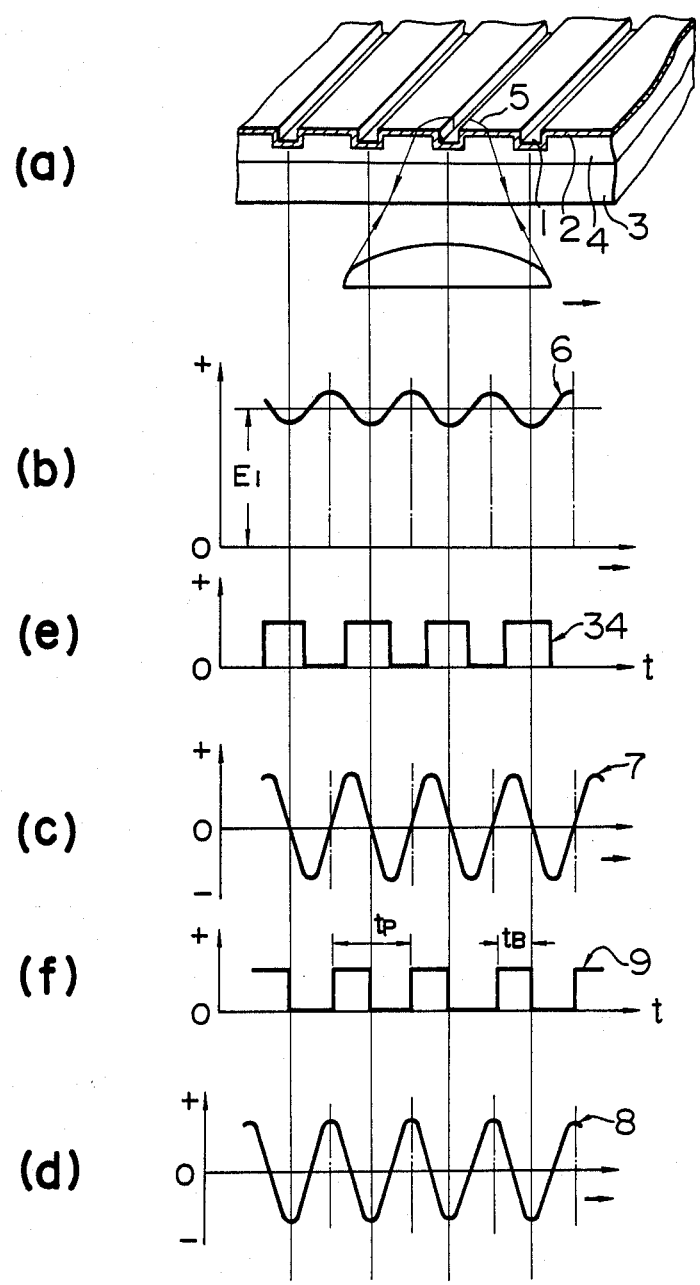
FIGS. 1(a)–(d) are explaining the signals used in a realization of this invention.

Supposing that the pitch of the tracks on an optical disk is 1.6 $\mu$m, there are about 50,000 tracks on one side of the disk, whose diameter is 300 mm. A number of sectors are disposed in these tracks for marking off data in each of the tracks. In order to record information from the exterior in an arbitrary place, or to reproduce or erase, an access operation to find the relevant track on the surface of the disk and then to find the relevant sector in the track is necessary. That is, a seek operation to move the light spot with a high speed to the neighborhood of the desired track, a tracking servo operation to maintain the light spot on the center line of the track, and a jump operation to correct deviations of the light spot from the aimed track are necessary. Such an access operation in an optical disk device is described in Japanese Patent Application un-examined publications Nos. 83-91536 and 83-169370; U.S. Ser. No. 736,125, now U.S. Pat. No. 4,607,358, which is a continuation of U.S. Ser. No. 443,399 and EPC Application No. 82110907.1, the last two of which are foreign applications based on the first two Japanese Applications.

This invention relates specifically to detection of the timing for switching from the seek operation to the tracking servo operation and is characterized in that the passage velocity of the light spot as it moves across the track is detected and used for determining the start time of the setting operation. Specifically, this invention is characterized in that, in order to determine the timing, a signal indicating light intensity as the light spot moves across the track and a tracking error signal (tracking signal) are used. That is, the velocity of the light spot as it moves across the track is detected by using a tracking error signal representing deviation of the center of the light spot from the center line of the track and then a track passage pulse representing the moment when the center of the light spot passes through the center line of the track is formed by using the tracking error signal and a signal representing the light intensity. The setting of the light spot is started in synchronism with the track passage pulse under the condition that the velocity thus detected is reduced below a limit velocity.

Hereinbelow, this invention will be explained in accordance with some preferred embodiments. FIG. 1a is a cross-sectional view showing a part of an optical disk used for the realization of this invention. On the optical disk a memory (recording) layer 2 is disposed through a subbing layer 4 made of ultraviolet curing resine, etc. on a disk-shaped transparent substrate 3 made of glass, plastic, etc. On the surface of the memory layer 2 one or a plurality of guide grooves of concave cross-sectional construction having a certain width and depth is (are) formed in a spiral form or in a form of concentric circles having a constant pitch. This (these) guide groove(s) 1 is (are) obtained by transposing one or a plurality of guide grooves or header-pits formed on a surface of a metallic mold (mother disc) to the subbing layer 4 and then forming uniformely the memory layer 2 on the subbing layer 3.

As the memory layer 2, for example, in the case of the ablative recording, e.g. a PbTeSe layer, whose main component is Te, is used; in the case of the magneto-optical recording, e.g. a perpendicular anisotropy magnetic film made of TbFeCo, whose main component is TbFe, is used; and in the case of the phase change recording, an amorphous layer of the Te group is used. For the one-side recording, the memory layer 1 of this optical disk is protected by a transparent protective layer (not shown) such as glass and for the two-side recording two optical disks are joined intimately together or through a spacer with adhesive so that their memory layers are opposite to each other. The structure by which two disks are joined intimately together is used specifically for the magneto-optical recording and the phase change recording and the air sandwitch structure is used for the ablative recording. One revolution of the guide groove is divided into a plurality of sectors and each of the sectors consists of a header part, where memory contents necessary for controlling the information stored in the sector, such as the number of the track (track address), number of the sector, etc., are stored previously as pits of phase structure, and the data part where a user stores information. The information is recorded either in the guide groove 1 or the plane part between two adjacent guide grooves along them. In the case where the information is recorded in the guide groove, the pits of the header part are disposed also in the groove, and in the case where it is recorded on the plane part, the pits of the header part are disposed also on the plane part.

Such an optical disk is rotated around a rotating shaft by a motor (not shown) and an optical head consisting of a laser source and an optical system focuses the laser light flux and forms an extremely small spot 5 through the substrate 3 and subbing layer 4 onto the recording surface of the disk. The optical head is approximately positioned by an actuator for coarse positioning such as a linear motor with respect to the track on the optical disk. In this case, as the position detector, an external scale such as an optical linear scale, etc. is used. After the termination of the seek operation by means of the actuator for coarse positioning, the seek operation is switched to the tracking servo operation. The tracking servo operation is performed by means of an actuator for fine positioning such as a galvano mirror mounted on the optical head. It is preferable to effect a two-stage servo, by which the movement of the actuator for fine positioning is detected during this tracking servo operation and together therewith, the actuator for coarse positioning is driven. Such a two-stage servo is disclosed in the above-mentioned Japanese Patent Application un-examined publications Nos. 83-91536 and 83-169370.

Next, the signal representing the reflected light intensity and the tracking error signal, which are used for this invention, will be explained. Light reflected by the optical disk is separated from the projected light by a beam splitter after having passed through an objective lens mounted in the optical head and is then opto-electrically transformed by means of a light detector. The signal representing the reflected light intensity and the tracking error signal are produced by using the output of this light detector. Various detection methods for the tracking error signal and the signal representing the reflected light intensity are described in Japanese Patent Application un-examined Publication No. 83-91536.

When the light spot passes with a constant speed through the guide groove (called track, when information has been recorded therein), the signal 6 representing the light intensity after the light flux reflected by the disk has passed through the objective lens mounted in the optical head, and the signal 7 representing deviation of the light spot from the track vary corresponding to its position with respect to the track, as indicated in (b) and (c), respectively. That is, they have sinusoidal waveforms, whose period is equal to the pitch of the track, and the signal representing the light intensity and the tracking error signal are so related that their phases are shifted by 90° from each other.

This invention is characterized in that the timing for setting up the light spot into the track is determined based on the signal 6 representing the reflected light intensity and the track error signal 7. Consequently, according to this invention, initially the velocity with which the light spot moves across the track (guide groove), is detected. This passage velocity can be detected as the amplitude of a signal obtained by differentiating the tracking error signal 7. FIG. 1(d) shows the track passage velocity signal 8 obtained by differentiating the tracking error signal 7.

In addition, as another method for detecting the velocity, there is a method, by which the velocity is obtained by measuring the movement time from one track to another track, utilizing the fact that the pitch of the track is constant. The movement time can be determined by forming a pulse signal 9 representing that times at which the light spot passes through the zero point by means of the tracking error signal 7, as indicated in FIG. 1(f) and measuring the time $t_p$ from the rise of a pulse to the rise of the following pulse or the width in time $t_B$ of a pulse.

Figure 2:
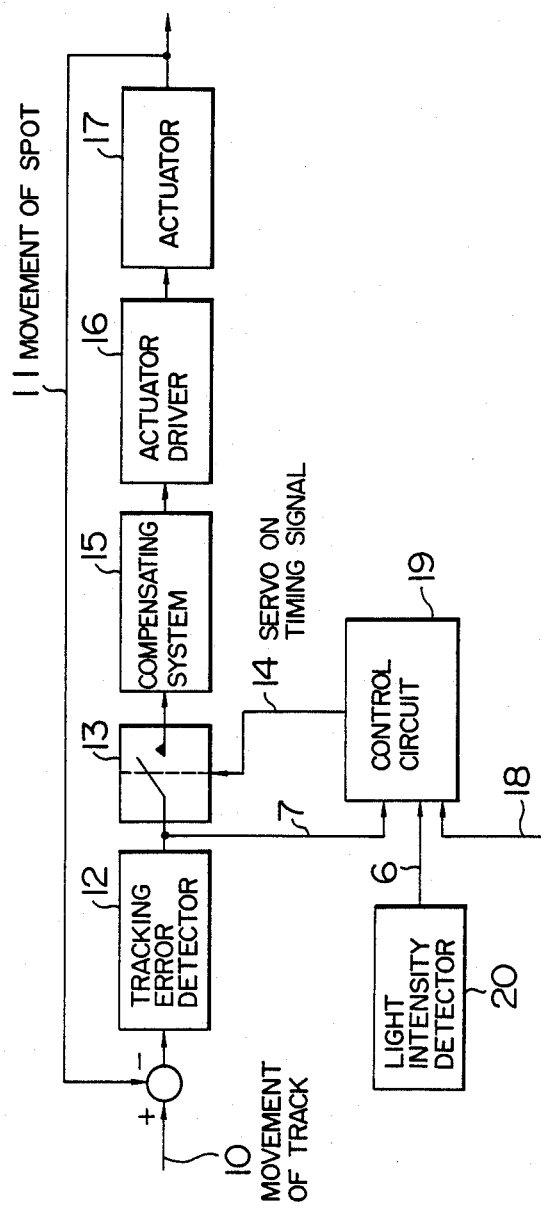
FIG. 2 is a block diagram of a tracking control device for realizing the tracking servo setting method according to this invention.

An embodiment for stably setting up the light spot onto the track will be explained by referring to the block diagram in FIG. 2 representing a tracking servo system, which shows only a tracking servo system using an actuator for fine positioning. In the above-described two-stage servo, the tracking operation is performed by interlocking the actuator for coarse positioning and the actuator for fine positioning. However, since only the tracking servo system using the actuator for fine positioning is related to the tracking operation, explanation will be made only to the tracking servo system using the actuator for fine positioning. Deviation of the movement of the track 10 from the movement of the spot 11 is detected optically by a well known method in a tracking error detector 12, whose output gives the tracking error signal 7. This signal 7 is inputted to a switching circuit 13, which is controlled by the servo ON timing signal 14. The output of the switching circuit 13 drives the actuator 17, such as a galvano mirror mounted on the optical head, a voice coil disposed on the objective lens, etc., through a compensating system 15 and an actuator driver 16 and positions the light spot on the track. The servo ON timing signal 14 controlling the operation of the tracking servo system is outputted by detecting the timing permitting a stable light spot setting operation, using the tracking error signal 7 and the light intensity signal 6, by means of a control circuit 19 started by a tracking ON signal 18 sent as a command to effect the tracking operation from a controller of a higher order (not shown).

Figure 3:
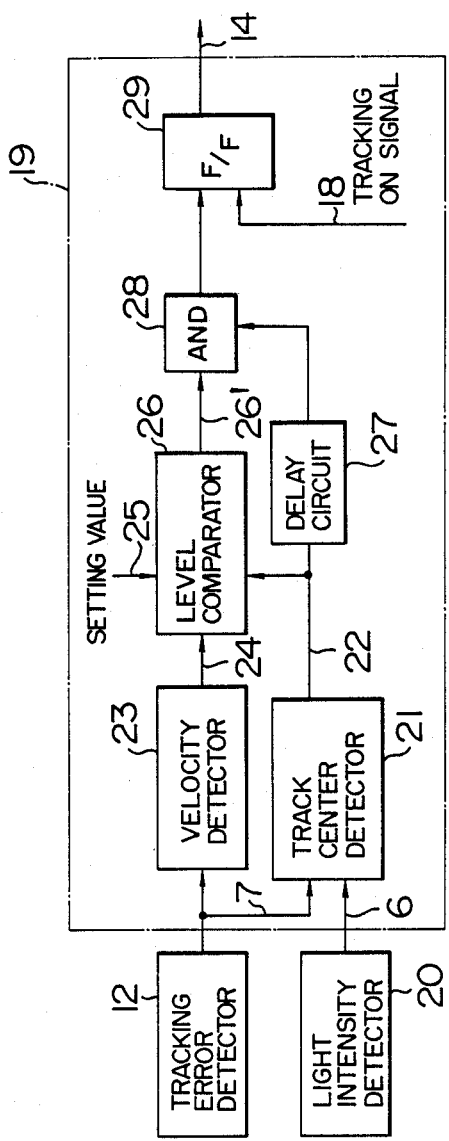
FIG. 3 is a scheme showing the construction of a control circuit thereof.

FIG. 3 shows the construction of this control circuit 19. The tracking error signal 7 outputted by the tracking error detector 19 and the light intensity signal 6 outputted by the light intensity detector 20 are inputted to a track center detector 21, which generates a track passage pulse signal 22 representing the moment, when the light spot passes through the center line of the track. Further, the tracking error signal 7 is inputted to a velocity detection circuit 23, which outputs a signal 24 representing the velocity with which the light spot moves across the track. This signal 24 and a setting level voltage 25 corresponding to a predetermined minimum velocity (setting velocity) are inputted to a level comparison circuit 26, which outputs a logic level "1" at the velocity, with which the light spot moves across the track, becomes lower than the setting velocity. The track passage pulse signal 22 is delayed by a time (usually from several nanoseconds to several tens of nanoseconds) necessary for the level comparison operation stated above, in a delay circuit 27, whose output is inputted to an AND circuit 28 together with the output of the level comparison circuit 26 stated above, in order to obtain a logic product of these two signals. In this way, when the track passage velocity is lower than the setting velocity, a pulse is outputted every time the light spot moves approximately across the center line of the track. This pulse is inputted to a flip-flop circuit 29, for example, a D-T flip-flop circuit) together with the tracking ON signal 18 commanded by the control circuit of higher order and thus, after the tracking ON signal 18 has become logic level "1", the output of another flip-flop circuit 29 becomes logic level "1" in synchronism with the next arriving pulse. This output is the servo ON timing signal 14.

Figure 4:
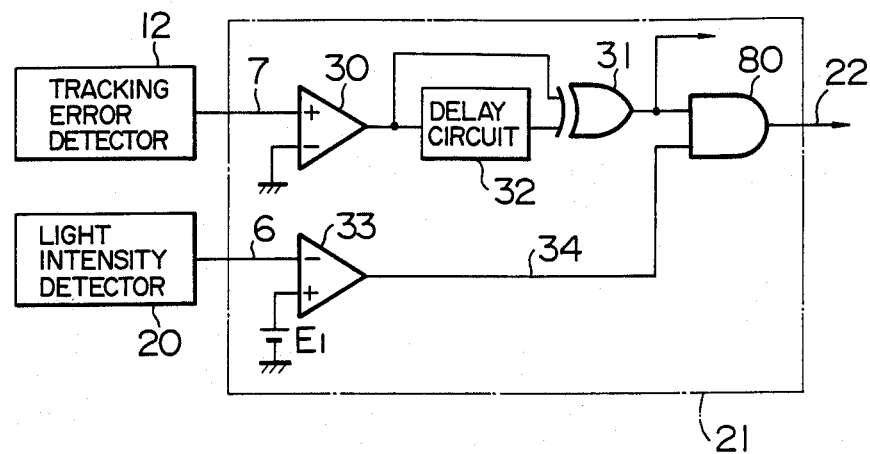
FIG. 4 is a circuit diagram of a track center detector.
Figure 6:
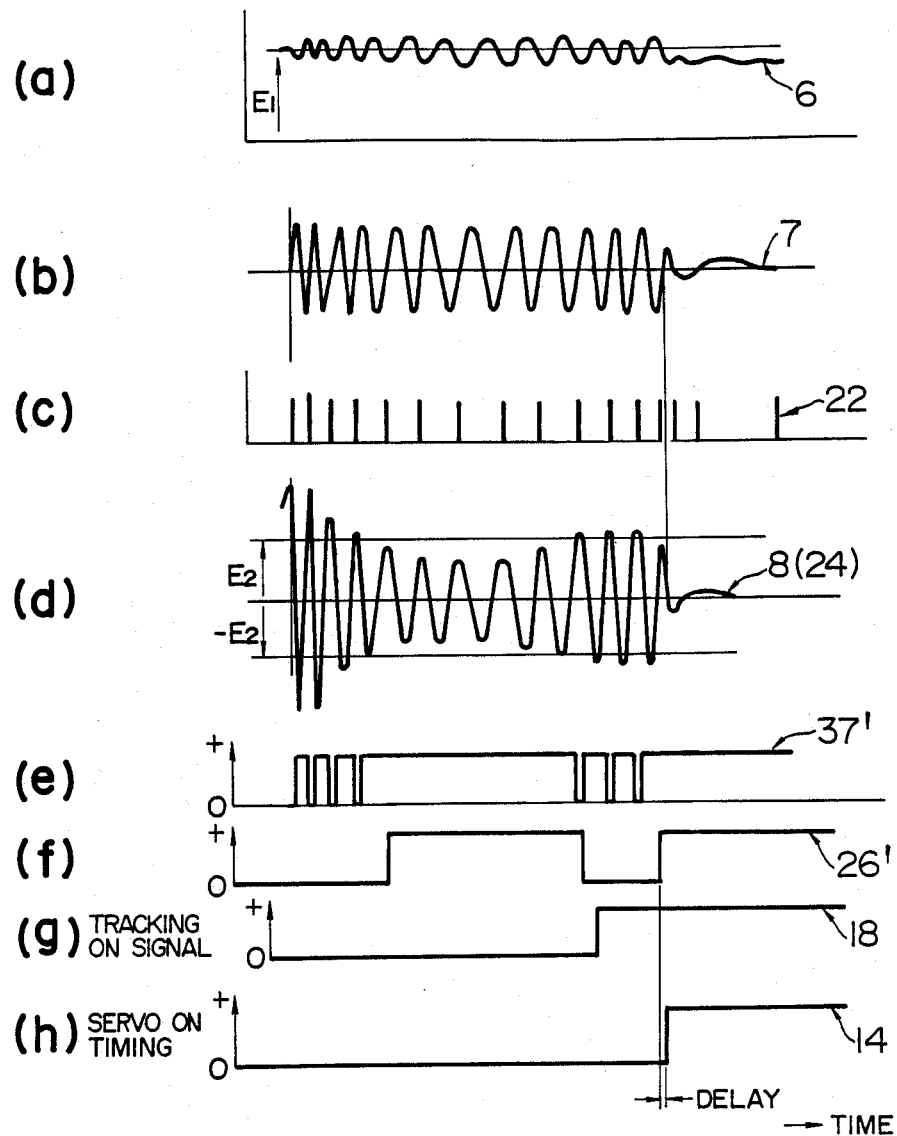
FIGS. 6(a)–(h) are timing charts therefor.

Next construction of the circuit 21 for detecting the track center and the timing thereof will be explained, referring to FIGS. 1, 4 and 6. The tracking error detection signal 7 is inputted the comparator 30 and compared in with the zero point. In this way the signal indicated in FIG. 1(f) is obtained, which is inputted through a delay circuit 32 to one of the two inputs of an exclusive OR circuit 31 and directly to the other. Then, pulses having a width in time corresponding to the delay time of the delay circuit 32 at the rise and the fall, respectively, of the signal indicated in FIG. 1(f) appear at the output of the exclusive OR circuit. Further, the light intensity signal 6 is inputted to the comparator 33 and compared with a predetermined level (e.g. an average level) $E_1$, what produces a track position signal 34 representing the presence of the track, as indicated in of FIG. 1(e). The logic product of this signal with the output of the exclusive OR circuit 31 stated above formed in an AND circuit 80 gives the track passage pulse signal 22, consisting of a series of pulses rising at the moment where a track exists and where the tracking error signal is zero (which can be considered as the center of the track), as indicated in FIG. 6(c).

Figure 5:
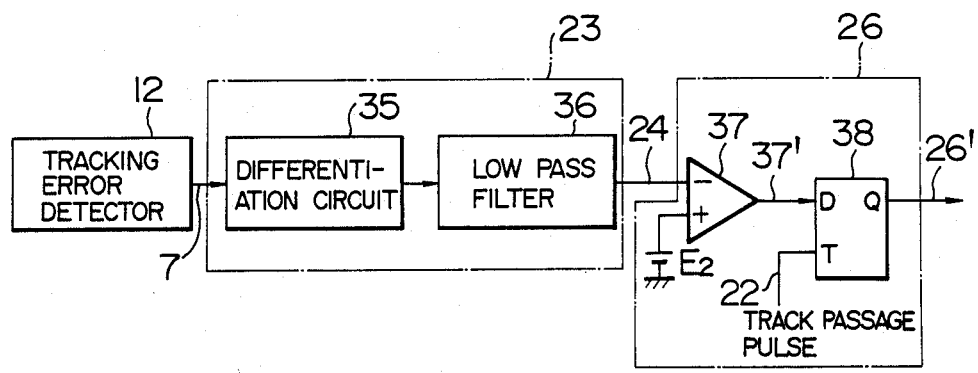
FIG. 5 is a circuit diagram of a velocity detector.

Next, the construction of the velocity detection circuit 23 and the circuit judging that the detected velocity is lower than the setting velocity will be described for 2 embodiments. At first, as shown in FIG. 5, the tracking error signal 7 is inputted to a differentiating circuit 35 and produces the velocity signal 8 having an amplitude proportional to the velocity, where the track exists, as indicated in FIG. 6(d). However, since high frequency components increase when it is differentiated, the high frequency components are removed by using a low pass filter 36. The cut-off frequency of this low pass filter 36 is determined so as to be higher than the frequency component of the velocity signal 8. The output of the low pass filter 36 is referred to as track passage velocity signal 24.

The track passage velocity signal 24 is inputted to one of the inputs of the comparator 37 and compared with a level $E_2$ corresponding to the setting velocity. When the track passage velocity signal 24 is lower than the level $E_2$, a signal 37' having the logic level "1" is produced, as indicated in FIG. 6(e), which is inputted to one of the inputs of flip-flop circuit 38 (D-T flip-flop), the track passage pulse signal 22 being inputted to the other input T. In this way, it is determined if the passage velocity, with which the light spot moves across the center line, is lower than the setting velocity and when the former is lower than the latter, the signal 26' having the logic level "1" is outputted in synchronism with the pulse 22, as indicated in FIG. 6(f). This output 26' and the output of the delay circuit 27 are inputted and the tracking servo ON timing signal 14 FIG. 6(f) is produced by the method described above by using the output of the AND circuit 28 and the tracking ON signal 18.

When the loop of the servo system indicated in FIG. 2 is closed by the servo ON timing signal 14 described above, the light spot is positioned stably on the center line of the track. Variations of these detection signals are indicated in FIGS. 6(a), (b) and (c). Further, although, in the explanation of the method for determining if the detected velocity is lower than the setting velocity, only the velocity of positive polarity has been described, a similar determination is performed for the velocity of negative polarity, as indicated in FIG. 6(d).

Figure 7:
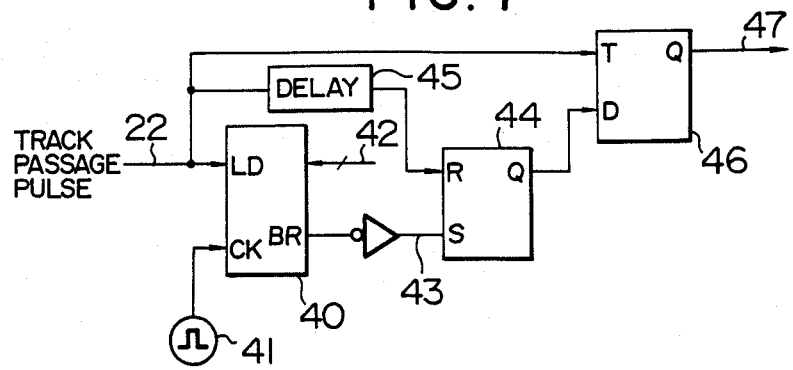
FIG. 7 is a circuit diagram of another velocity detector.
Figure 8:
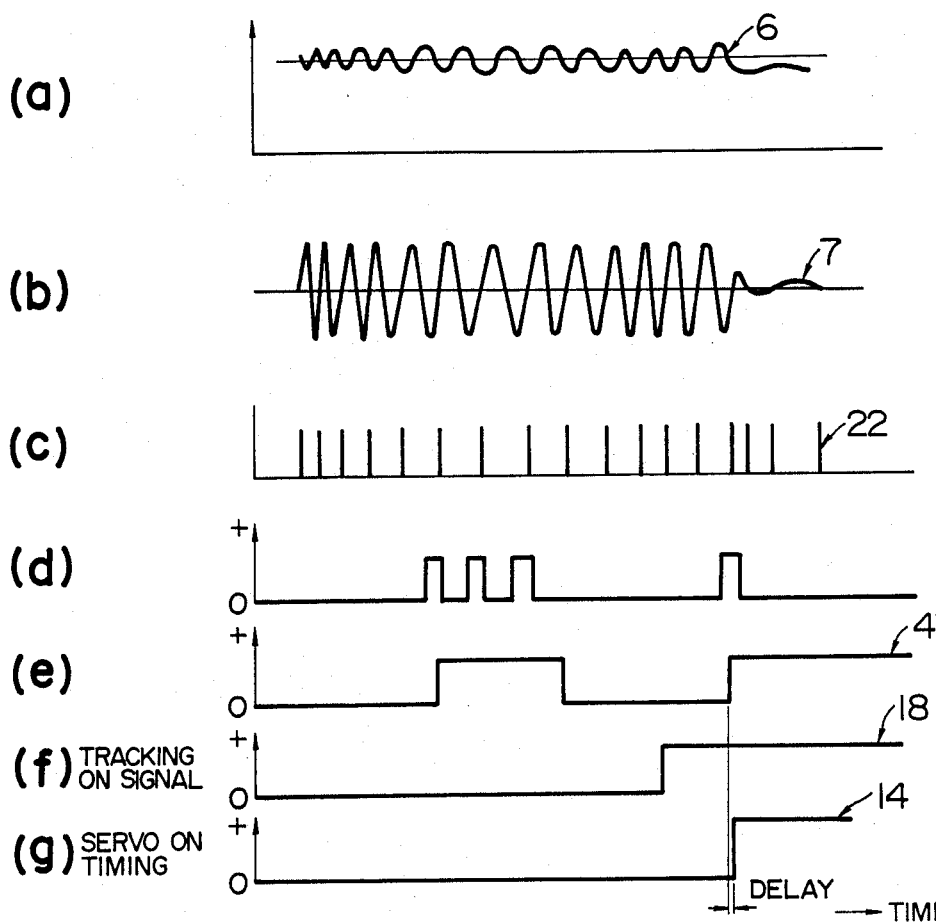
FIGS. 8(a)–(g) are timing charts therefor.

Next, another embodiment for detecting the velocity will be explained, referring to FIGS. 7 and 8. The track passage pulse signal 22 is inputted into one of the inputs of a down counter 40. To the other input of the counter 40, pulses having a constant repetition period are inputted from an oscillator 41. In the counter 40 an initial value 42 has been previously set. This value is an integer representing the ratio of the time necessary for the passage of a track pitch interval with the setting velocity to the constant repetition period described above. In this way, when the interval between two successive track passages becomes longer (the passage velocity becomes lower) and the passage velocity becomes lower than the setting velocity, a BR signal 43 is produced, which indicates that the content of the down counter 40 is zero. This is inputted to the set input S of the flip-flop circuit 44, and to its reset input R is inputted the output obtained at the output of a delay circuit. The track passage pulse signal 22 is inputted to the delay circuit 45. Then, at the output of the flip-flop circuit 44, a pulse signal indicating that the velocity has decreased is generated, as indicated in FIG. 8(d), when the interval between two successive track passage pulses 22 increases (see FIG. 8(c)). This signal is inputted to the D-terminal of a D-T flip-flop 46 and on the other hand the track passage pulse signal 22 is inputted to the T-terminal. Thus, a signal indicated in FIG. 8(e) can be obtained, when the output of the flip-flop 46 is synchronized with the track passage pulse signal 22. The tracking ON signal 18 is generated, similarly to the preceding embodiment, by using this signal 47, and the tracking servo ON timing signal 14 is produced by using the track passage pulse signal 22, as indicated in FIG. 8(g).

In this embodiment, if only the function to detect the velocity is necessary, instead of the track passage pulse signal 22 inputted to the counter 40 and the flip-flop circuit 46, the track position signal 34 and the signal 9

(FIG. 1(f)) obtained by inputting the tracking error signal 7 can be used.

In the case where this invention is realized only by using the tracking error signal 7, since it is not possible to detect the center line of the track because of the absence of the light intensity signal 6, the tracking servo ON timing signal 14 cannot be synchronized with the track passage pulse signal 22, but in this case, it is sufficient to generate the tracking ON signal 18 and the servo ON timing signal 14 at the same time.

Figure 9:
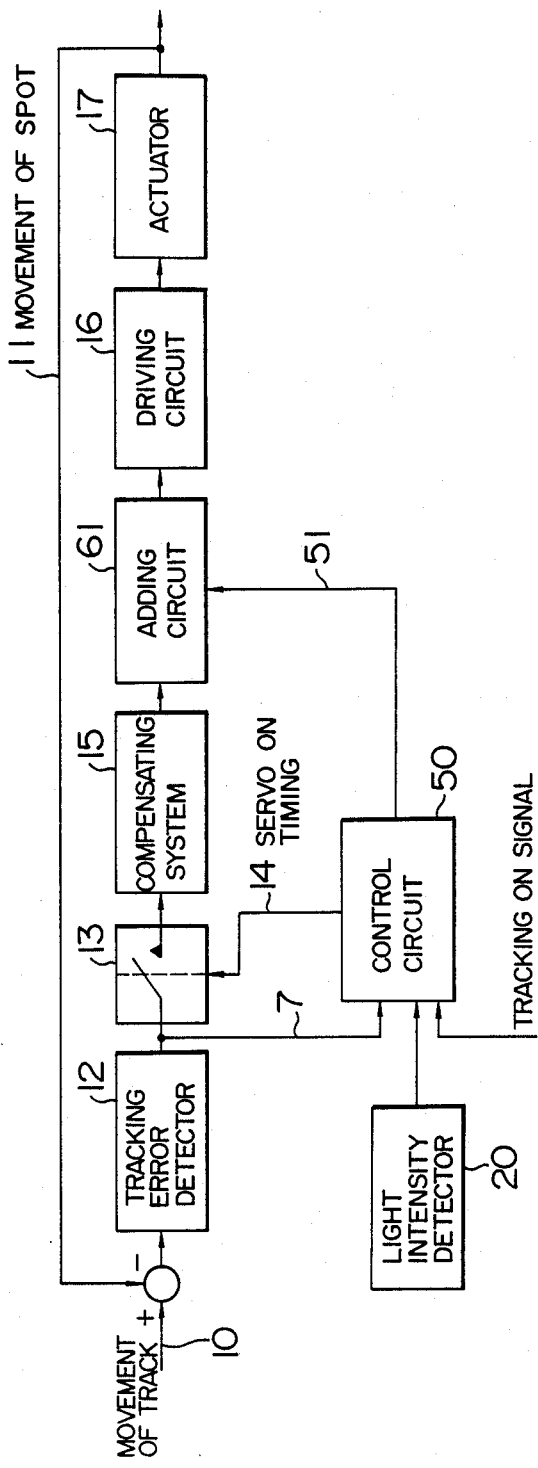
FIG. 9 is a block diagram of a tracking control device for realizing another embodiment of this invention.

Next, another embodiment, in which the setting operation is effected directly after the tracking ON signal, when waiting for the track passage velocity to become lower than a predetermined value becomes too long, will be explained below. FIG. 9 shows an example of track following control systems according to this embodiment. The tracking error signal 7 and the light intensity detection signal 6 are inputted to a control circuit 50, in which the track passage velocity is detected and a signal 51 for driving the actuator 17, so that the velocity thus detected is lower than a predetermined value, is produced. When the light spot is at the center line of the track thereafter, the servo ON signal 14 is generated, which begins the setting operation by closing the servo system.

Figure 10:
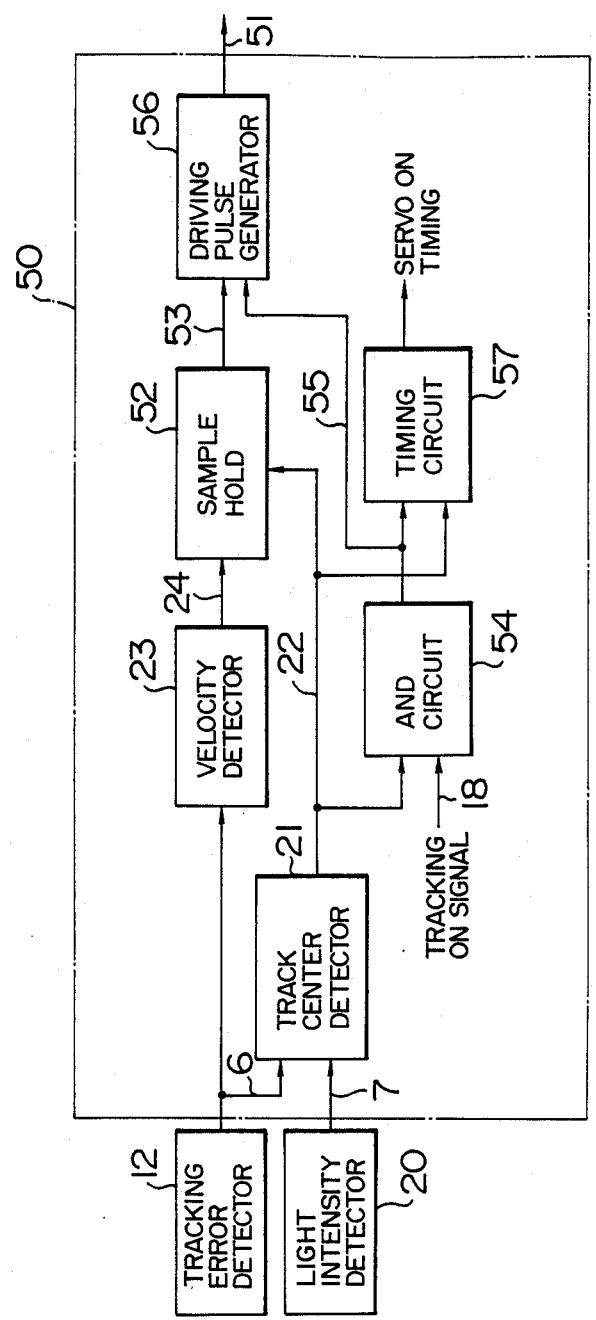
FIG. 10 is a scheme showing the construction of a control circuit therefor.
Figure 11:
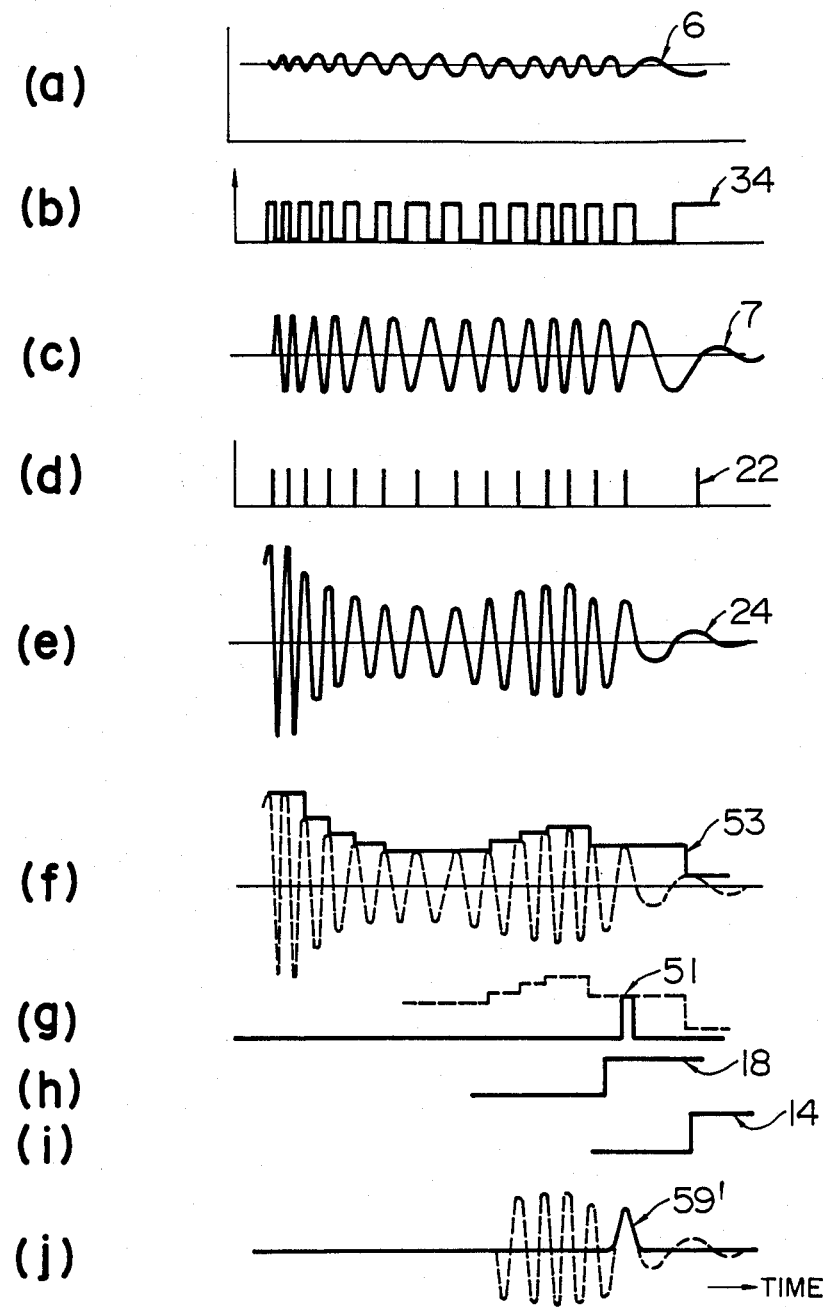
FIGS. 11(a)–(j) are timing charts therefor.

FIG. 10 shows the construction of this control circuit 50. The velocity detection circuit 23 and the track center detection circuit 21 are identical to those described for the preceding embodiment. The velocity signal 24 (FIG. 11(e)) and the track passage pulse signal 22 (FIG. 11(d)) are inputted to a sample hold circuit 52, where a sample velocity signal 53 as indicated in FIG. 11(f) is detected. On the other hand, the tracking ON signal (18 FIG. 11(h)) and the track passage pulse signal 22 are inputted to an AND circuit 54, from which a track passage pulse signal 55 after the tracking ON demand is taken out, which is inputted to a driving pulse generation circuit 56. To the other input of this circuit is inputted the sample velocity signal 53. Then, in this circuit 56, only one pulse of the signal 51 for driving the actuator, which has a predetermined pulse width $\tau$ and an amplitude equal to that of the sample velocity signal 53, is generated in synchronism with the rise of the track passage pulse signal 55. The track passage pulse signal 55 after the tracking ON demand and the track passage pulse signal 22 are inputted to a timing circuit 57, in which the servo ON timing signal 14 (FIG. 11(i)) is generated, which rises in synchronism with the rise of the track passage pulse signal 22 just after the track passage pulse 55 after the tracking ON demand.

Figure 12:
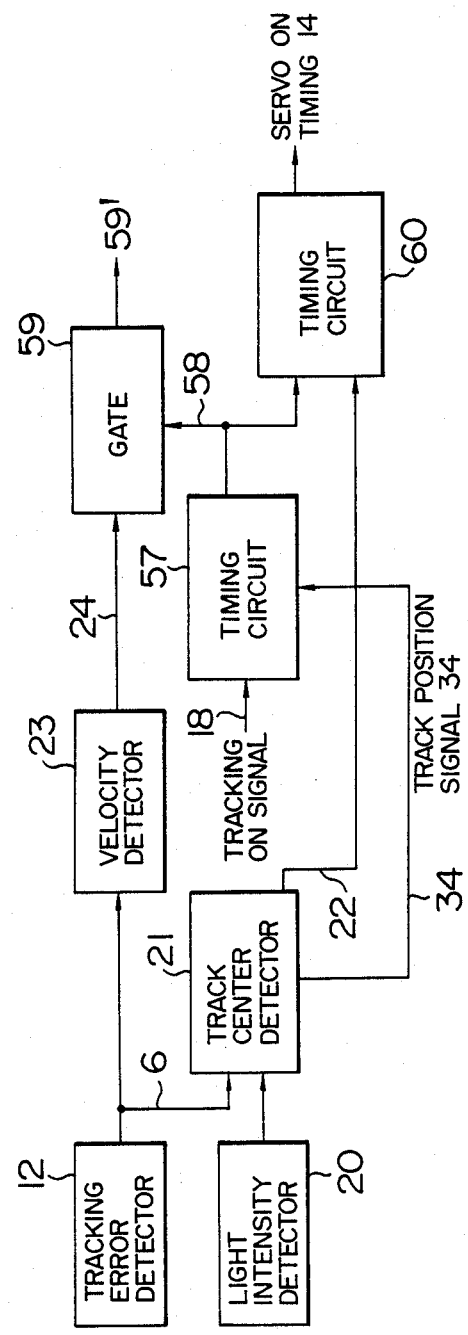
FIG. 12 is a scheme showing the construction of another control device.

FIG. 12 shows another embodiment for generating the signal for driving the actuator 17. The tracking ON signal 18 and the track position signal 34 coming from the circuit 21 for detecting the track center are inputted to the timing circuit 57, which takes out only one pulse of the track position signal 34 after the rise of the tracking ON signal 18. The velocity signal 24 passes through a gate circuit 59 only during the pulse of this signal 58, which generates a driving signal 59', as indicated in FIG. 11(j). In this embodiment, the servo ON timing signal 14 generates a signal synchronized with the rise of the track passage pulse signal 22 just after the fall of the abovementioned signal 58 by means of a timing circuit 60, as indicated in FIG. 11(i).

In the embodiment described above, in the case where the actuator 17 has no sufficient power, no necessary velocity can be obtained with one driving pulse 51 or 59'. In this case, after a driving pulse has been generated once, the passage velocity is again detected at the succeeding track center. This operation is repeated until the detected velocity becomes lower than the setting velocity and finally a servo ON timing signal 14 is produced.

Further, this method can be utilized, also when no necessary speed can be obtained with one driving pulse by some reason (detection miss, movement of the light spot due to external force, etc.).

When the actuator 17 has sufficient power, it is not necessary to move the light spot to set it up onto the succeeding track as in the preceding embodiments. In the track where the passage velocity is detected, a servo ON timing signal 14 is generated, which sets up the light spot onto that track. Consequently, the timing circuits 57, 60 don't wait for the following track (represented by the track passage pulse 22) and produces immediately a timing signal 14, when the passage velocity is detected. In this embodiment, instead of the differentiating circuit 35 and the adding circuit 61, a lead-lag circuit, which is often utilized for phase compensation of a servo system, can be used while commuting its time constants and gains so that the circuit can be used for two purposes. Furthermore, in this embodiment, the duration of the driving signal for driving the light spot can be either a constant period of time $\tau$ or a time until it is detected that the amplitude of the tracking error signal becomes lower than a predetermined value.

Next, another example of detection methods for the light intensity signal 6 and a setting operation using it will be explained. Although, in order to detect the track position signal from the light intensity signal, it is compared in level with a constant value $E_1$, the track position signal cannot be detected correctly, if the level of the light intensity signal varies due to variations of the reflection coefficient of the disk. Therefore, the output obtained by making the light intensity signal pass through a reduction filter can be used instead of the level $E_1$ stated above. However, in the case where the frequency of the light intensity signal is lower than the cut-off frequency of the reduction filter (when the passage velocity is low), since the output of the filter varies at the same time, the position signal 34 cannot be detected correctly. Considering the characteristics of the light spot setting, when the passage velocity is low, the light spot can be set to any position of the track, but when the velocity is high, the setting is possible only at the neighborhood of the center line of the track.

In this case, the interval of zero cross points $t_p$ in the tracking error signal 7 is measured, on the basis of which the passage velocity is detected. When a tracking ON signal 18 arrives, it is examined with priority if the velocity detected from the tracking error signal 7 is high or low. If it is low, a servo ON timing signal 14 is immediately produced and if it is high, the setting operation is effected according to the procedure described in the preceding embodiments stated above by using the track position signal obtained by comparing the light intensity signal with the output of the reduction filter.

In the case where the setting of the light spot onto the track according to the prior art techniques, time was necessary for detecting the eccentricity. According to this invention, to the contrary, the setting operation can be effected, as soon as a demand to close the control system is received, and in addition the light spot can be set up stably without any influence of external disturbance and mechanical vibration.

We claim:

1. A track setting method for a tracking servo system in which a light spot is projected onto a recording medium on which a guide groove of a plurality of tracks is formed in advance, a light flux coming from said recording medium is opto-electrically transformed, a tracking error signal representing deviations of the center of said light spot from a center line of said track is detected using the output obtained by the opto-electrically transformation, and the position of the projected light spot is controlled using said tracking error signal so that said light spot follows said track, comprising the steps of:
   detecting a passage velocity at which said light spot moves across said track, based on said tracking error signal;
   determining an intensity signal representing the light intensity of said light flux coming from said recording medium using said output obtained by said opto-electric transformation; and
   determining a timing signal for beginning a setting operation for setting said light spot on said track by generating a pulse representing a moment in time at which said light spot moves across substantially said center line of said track using said tracking error signal, said timing signal being generated substantially in synchronism with said pulse only when said passage velocity is lower than a predetermined minimum velocity value.

2. A track setting method according to claim 1, wherein when a tracking ON demand signal is received, said passage velocity is detected and said light spot is forced to move to a different location according to said passage velocity thus detected.

3. A track setting method according to claim 1, further comprising the steps of:
   comparing said light intensity signal with a predetermined minimum intensity value to generate a first pulse based on the comparison;
   comparing said tracking error signal with a zero level to generate a second pulse based on the comparison;
   generating a third pulse set representing the rise portions and fall portions of said second pulse, wherein said pulse representing a moment in time at which said light spot moves across said center line of said track is generated based on a logical product of said first pulse and said second pulse.

4. A track setting method according to claim 3, wherein said predetermined minimum intensity value is provided by passing said intensity signal through a low pass filter.

5. A track setting method according to claim 3, wherein said predetermined minimum velocity value is a variable value.

6. A track setting device comprising:
   tracking error detection means for projecting a light spot onto a recording medium on which a guide groove formed of a plurality of tracks is formed in advance and for detecting a signal representing deviation of said light spot from a center line of said track based on a light flux reflected from said recording medium;
   tracking control servo system means for controlling the projected position of said light spot, based on an output of said tracking error detection means, such that said light spot follows said track;
   light intensity detection means for detecting an intensity signal representing the light intensity of said light flux reflected from said recording medium;
   timing signal generation means connected to said tracking error detection means and said light intensity detection means for determining a passage velocity at which said light spot moves across said track, and for generating a timing signal for beginning a setting operation of said tracking control servo system on the condition that said passage velocity thus detected is lower than a predetermined minimum velocity value, said timing signal generation means comprising; a velocity detector, connected to said tracking error detection means, for detecting said passage velocity based on an output of said tracking error detection means, a track center detection means connected to said tracking error detection means and said light intensity detection means, for generating a pulse representing a moment in time at which said light spot moves across substantially said center line of said track, and a timing circuit for generating said timing signal substantially in synchronism with said pulse output from said track center detection means only when said passage velocity from said velocity detection means is lower than said predetermind minimum velocity value.

7. A track setting device according to claim 6, wherein said timing signal generation means further comprises:
   first means connected to said track center detection means for detecting said passage velocity at which said light spot moves across substantially said center line of said track based on said pulse coming from said track center detection means and for generating a signal indicating that said passage velocity thus detected is lower than said predetermined minimum velocity value substantially in synchronism with said pulse; and
   second means connected to said first means for providing a logical product of a signal obtained by retarding said pulse coming from said track center detection means by a predetermined value and the output of said first means, to generate said timing signal.

8. A track setting device according to claim 6, further comprising:
   first means connected to said velocity detection means and said track center detection means for comparing an output of said velocity detection means with said predetermined minimum velocity value and for generating a signal indicating that said passage velocity at which said light spot moves across substantially said center line of said track, is lower than said predetermined minimum velocity value in synchronism with said pulse coming from said track center detection means; and
   second means connected to said track center detection means and said first means for providing a logical product of a signal obtained by retarding said pulse coming from said track center detection means by a predetermined value and an output of said first means,
   wherein said timing circuit is a flip-flop circuit for receiving an output of said second means and a tracking ON demand signal.

9. A track setting device according to claim 6, wherein said timing signal generation means further comprises means for generating a signal for forcing said projected light spot to move to another location based on said passage velocity when a tracking ON demand signal is received.

10. A track setting device according to claim 6, further comprising:
   means connected to said velocity detection means and said track center detection means for sampling-and-holding an output of said velocity detection means based on said pulse coming from said track center detection means;
   means for receiving said pulse coming from said track center detection means and for taking out said pulse after receiving a tracking ON demand signal; and
   means for supplying a signal having a predetermined width and an amplitude corresponding to the magnitude of said output of said velocity detection means thus sampled-and-held in synchronism with said pulse taken out by said means for receiving to said tracking control means.

11. A track setting device according to claim 10, further comprising:
   means for receiving said first pulse and for taking out said pulse after receiving a tracking ON demand signal; and
   means for receiving an output of said means for receiving and for supplying said output of said velocity detection means to said tracking control means.

12. A track setting device according to claim 10, wherein said predetermined minimum intensity value is provided by passing said intensity signal through a low pass filter.

13. A track setting device according to claim 6, wherein said track center detection means comprises:
   means for comparing said intensity signal with a predetermined minimum intensity level for generating first pulses according to the result of the comparison;
   means for comparing an output of said tracking error detection means with a zero level for generating second pulses according to the result of the comparison, and for third generating pulses representing rise portions and fall portions of said second pulses; and
   means for providing a logical product of said first pulses and said second pulses.

14. A track setting device according to claim 6, wherein said velocity detection means comprises means for differentiating the output of said tracking error detection means and a low pass filter for receiving an output of said means for differentiating.

15. A track setting device according to claim 6, wherein said velocity detection means comprises means for measuring the distance between adjacent zero crossings of the output of said tracking error detection means.

16. A track setting device according to claim 6, wherein said predetermined minimum velocity value is a variable value.

* * * * *

UNITED STATES PATENT AND TRADEMARK OFFICE
CERTIFICATE OF CORRECTION

PATENT NO.   : 4,731,771
DATED        : Mar. 15, 1988
INVENTOR(S)  : Maeda et al.

It is certified that error appears in the above-identified patent and that said Letters Patent is hereby corrected as shown below:

<u>IN THE TITLE PAGE:</u>

Between line "[76] Inventors: Takeshi Maeda, 21-19," and

"[21] Appl. No.: 829,024" insert:

--Assignee:   Hitachi, Ltd., Tokyo, Japan--

Signed and Sealed this

Tenth Day of January, 1989

*Attest:*

DONALD J. QUIGG

*Attesting Officer*  *Commissioner of Patents and Trademarks*